United States Patent
Xu et al.

(10) Patent No.: US 7,808,218 B2
(45) Date of Patent: Oct. 5, 2010

(54) DUTY-CYCLE INDEPENDENT CURRENT LIMIT FOR A POWER REGULATOR

(75) Inventors: Jingwei Xu, Shanghai (CN); Jian Liang, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 15 days.

(21) Appl. No.: 12/266,122

(22) Filed: Nov. 6, 2008

(65) Prior Publication Data

US 2009/0128112 A1 May 21, 2009

Related U.S. Application Data

(63) Continuation of application No. PCT/CN2007/003156, filed on Nov. 7, 2007.

(30) Foreign Application Priority Data

Nov. 7, 2007 (CN) ............... PCT/CN2007/003156

(51) Int. Cl.
G05F 1/652 (2006.01)
G05F 1/656 (2006.01)
(52) U.S. Cl. ................ 323/222; 323/224; 323/282; 323/284; 323/285
(58) Field of Classification Search .......... 323/222, 323/224, 282, 284, 285
See application file for complete search history.

(56) References Cited

U.S. PATENT DOCUMENTS

| 6,178,104 | B1 | 1/2001 | Choi |
| 6,498,466 | B1 | 12/2002 | Edwards |
| 2006/0268586 | A1* | 11/2006 | Mikulenka et al. ........ 363/21.14 |
| 2007/0120547 | A1* | 5/2007 | Tateishi et al. ............. 323/282 |
| 2007/0252567 | A1 | 11/2007 | Dearn et al. |
| 2007/0257645 | A1* | 11/2007 | Nishino ...................... 323/276 |
| 2009/0278521 | A1* | 11/2009 | Omi et al. ................... 323/288 |

FOREIGN PATENT DOCUMENTS

JP 2004 208857 7/2004

* cited by examiner

*Primary Examiner*—Bao Q Vu
(74) *Attorney, Agent, or Firm*—William B. Kempler; Wade J. Brady, III; Frederick J. Telecky, Jr.

(57) ABSTRACT

One embodiment of the invention includes a power regulator system. The system comprises an error amplifier that provides an error voltage based on a comparison of a reference voltage and a feedback voltage associated with an output voltage of the power regulator system. The system also comprises a pulse-width modulation (PWM) comparator configured to generate a switching signal that controls activation and deactivation of at least one power switch. The PWM comparator defining a duty-cycle of the switching signal based on the error voltage. The system further comprises a current limit circuit configured to clamp the error voltage upon the error voltage exceeding a voltage limit having a magnitude that varies as a function of the duty-cycle to provide a predetermined current limit that is substantially fixed independent of the duty-cycle.

18 Claims, 4 Drawing Sheets

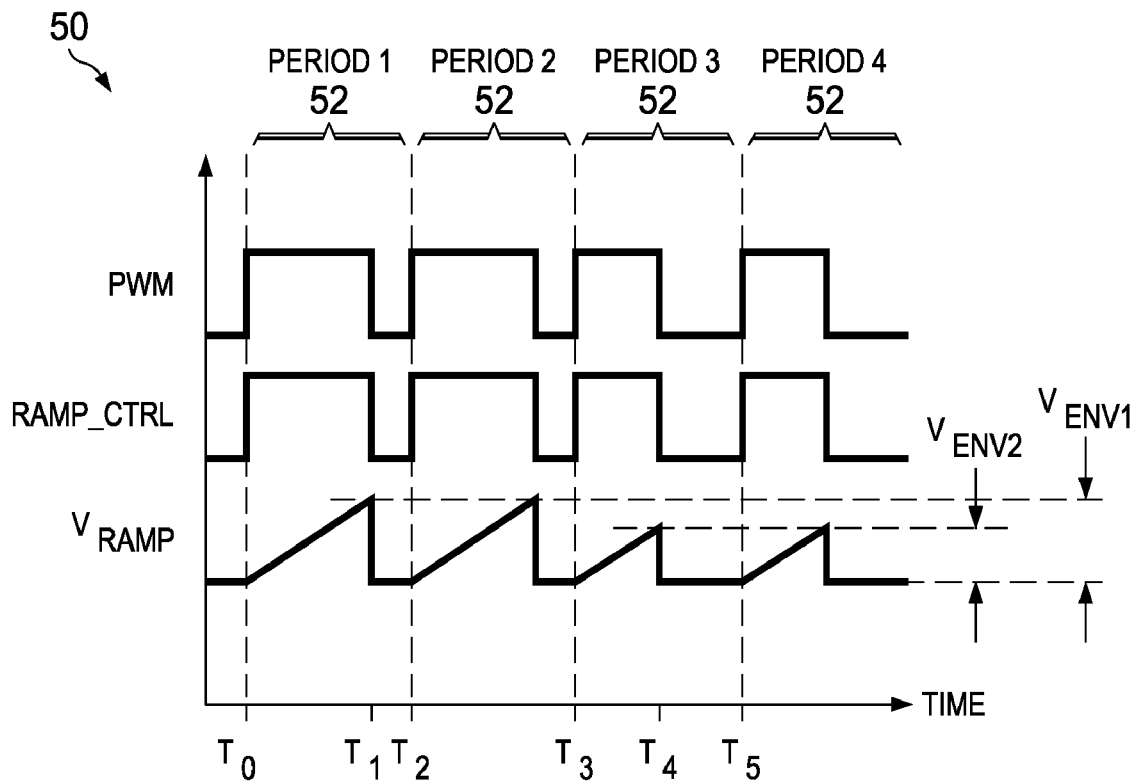
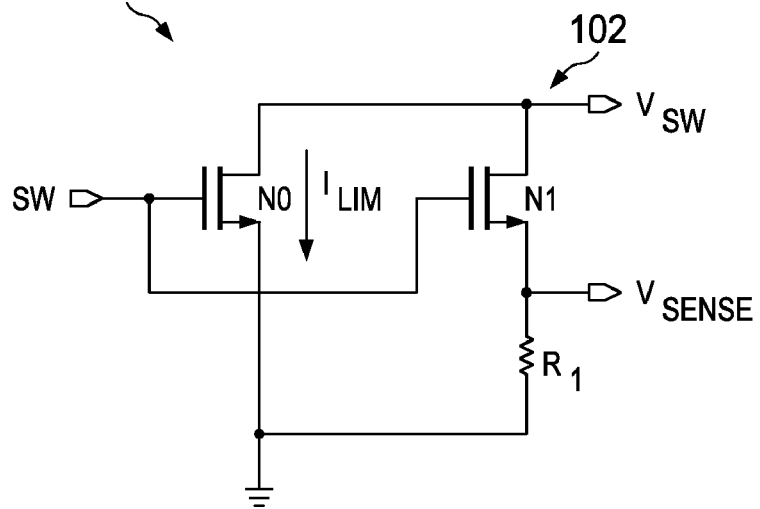

DUTY-CYCLE INDEPENDENT CURRENT LIMIT FOR A POWER REGULATOR

CROSS-REFERENCE TO RELATED APPLICATIONS

This application is a continuation of, and claims the benefit of domestic priority from, prior filed international application PCT/CN2007/003156, filed 7 Nov. 2007, which designated the United States. This application also claims a right of foreign priority from the same international application PCT/CN2007/003156, filed 7 Nov. 2007, which also designated at least one country other than the United States. The entirety of that international application is incorporated herein by reference.

TECHNICAL FIELD

This invention relates to electronic circuits, and more specifically to a duty-cycle independent current limit for a power regulator.

BACKGROUND

Linear and switch-mode voltage regulators constitute fundamental building blocks of today's power management integrated circuits (ICs). One such type of regulator is known as a switching regulator or switching power supply, which controls the flow of power to a load by controlling the on and off duty-cycle of one or more power switches coupled to the load. As an example, a switching regulator can reside in an IC, such that external feedback resistors and an external inductive power source are coupled to the switching regulator to provide a regulated voltage potential at the output of the inductor.

A typical switching converter implements pulse-width modulation (PWM) for controlling the duty-cycle of the one or more power switches coupled to the load. As an example, an error amplifier provides a signal corresponding to a difference between a reference voltage and a feedback voltage to a comparator that outputs an AC switching signal that defines the duty-cycle for the activation and deactivation to the one or more power switches. To protect the power supply system from current overload conditions, the current through the one or more power switches can be limited. As an example, current can be limited through the one or more power switches by a voltage clamp that limits the maximum output voltage of the error amplifier. However, for a power regulator that employs slope compensation to mitigate sub-harmonic instability of the duty-cycle, the current limit for the one or more power switches is typically dependent on the duty-cycle of the switching signal. As an example, in a typical boost regulator, the current limit through the one or more power switches can decrease as the duty-cycle increases. Accordingly, there is little control that can be exhibited over the maximum amount of current provided over a variety of ranges of desired input and output voltages.

SUMMARY

One embodiment of the invention includes a power regulator system. The system comprises an error amplifier that provides an error voltage based on a comparison of a reference voltage and a feedback voltage associated with an output voltage of the power regulator system. The system also comprises a pulse-width modulation (PWM) comparator configured to generate a switching signal that controls activation and deactivation of at least one power switch. The PWM comparator defining a duty-cycle of the switching signal based on the error voltage. The system further comprises a current limit circuit configured to clamp the error voltage upon the error voltage exceeding a voltage limit having a magnitude that varies as a function of the duty-cycle to provide a predetermined current limit that is substantially fixed independent of the duty-cycle.

Another embodiment of the invention includes a method for providing a substantially constant current limit through at least one power switch in a power regulator. The method comprises generating an error voltage having a magnitude that is based on a comparison of a relative magnitude of an output voltage of the power regulator system and a reference voltage. The method also comprises comparing a PWM voltage that is proportional to a current flow through the at least one power switch with the error voltage. The method also comprises generating a switching signal having a duty-cycle that controls activation and deactivation of the at least one power switch based on the comparison of the PWM voltage and the error voltage. The method also comprises generating a voltage limit having a magnitude that varies as a function of the duty-cycle to provide the substantially constant current limit as being fixed independent of the duty-cycle. The method further comprises clamping the error voltage upon the error voltage exceeding the voltage limit.

Another embodiment of the invention includes a power regulator system. The system comprises means for generating an error voltage having a magnitude that is based on a comparison of a relative magnitude of an output voltage of the power regulator system and a reference voltage. The system also comprises means for generating a first ramp waveform having a general sawtooth shape and a peak voltage that varies as a function of a duty-cycle of the power regulator and means for generating a second ramp waveform that is a substantial copy of the first ramp waveform. The system also comprises means for comparing a pulse-width modulation (PWM) voltage with the error voltage to generate a switching signal that controls activation and deactivation of the at least one power switch according to the duty-cycle of the power regulator system. The PWM voltage can be a sum of the first ramp waveform and a sense voltage proportional to the current flow through the at least one power switch. The system also comprises means for providing a voltage limit that is a sum of predetermined set voltage limit corresponding to a predetermined current limit through the at least one power switch and a peak voltage of the second ramp waveform. The system further comprises means for clamping the error voltage upon the error voltage exceeding the voltage limit to provide the predetermined current limit, such that the current flow through the at least one power switch is limited to the predetermined current limit independent of the duty-cycle of the power regulator system.

BRIEF DESCRIPTION OF THE DRAWINGS

FIG. 2 illustrates an example of a timing diagram in accordance with an aspect of the invention.

FIG. 3 illustrates an example of a power circuit in accordance with an aspect of the invention.

DETAILED DESCRIPTION

The invention relates to electronic circuits, and more specifically to systems and methods for providing a duty-cycle independent current limit for a power regulator. A pulse-width modulation (PWM) comparator generates a switching signal having a duty-cycle that defines activation and deactivation of at least one power switch. The PWM comparator compares an error voltage with a PWM voltage. The error voltage is generated based on a comparison of a relative magnitude of a reference voltage and a feedback voltage associated with an output of the voltage regulator. A PWM voltage is based on a sum of a ramp waveform and a sensed feedback voltage that corresponds to a sensed current flow through the power switch. A ramp generator generates the ramp waveform that has a period corresponding to the duty-cycle of the switching signal. As such, the ramp waveform has an increasing voltage magnitude during the on-time of the switching signal (i.e., during activation of the power switch), and a substantially zero voltage potential during the off-time (i.e., during deactivation of the power switch).

A current limit circuit is provided that includes an amplifier coupled to a current source and a resistor having magnitudes that correspond to a predetermined set current limit allowed through the power switch. The current limit circuit receives the ramp waveform or a copy of the ramp waveform and generates an envelope voltage that corresponds to a peak voltage of the ramp waveform. The current source and resistor provide a predetermined set voltage limit that corresponds to the predetermined set current limit. The predetermined set voltage limit is added to the ramp waveform to provide a voltage limit. The amplifier thus provides an output that is the voltage limit to a cathode of a diode. The error voltage is also provided to an anode of the diode. As a result, the diode clamps the error voltage upon the error voltage being approximately equal to the voltage limit. Therefore, when the error voltage is clamped, the voltage associated with the sensed current flow through the power switch is approximately equal to the predetermined set voltage limit, as the ramp waveform magnitudes in the voltage limit and the PWM voltage are cancelled relative to each other. Accordingly, the current through the power switch is limited to a constant value regardless of the duty-cycle of the switching regulator.

Figure 1:
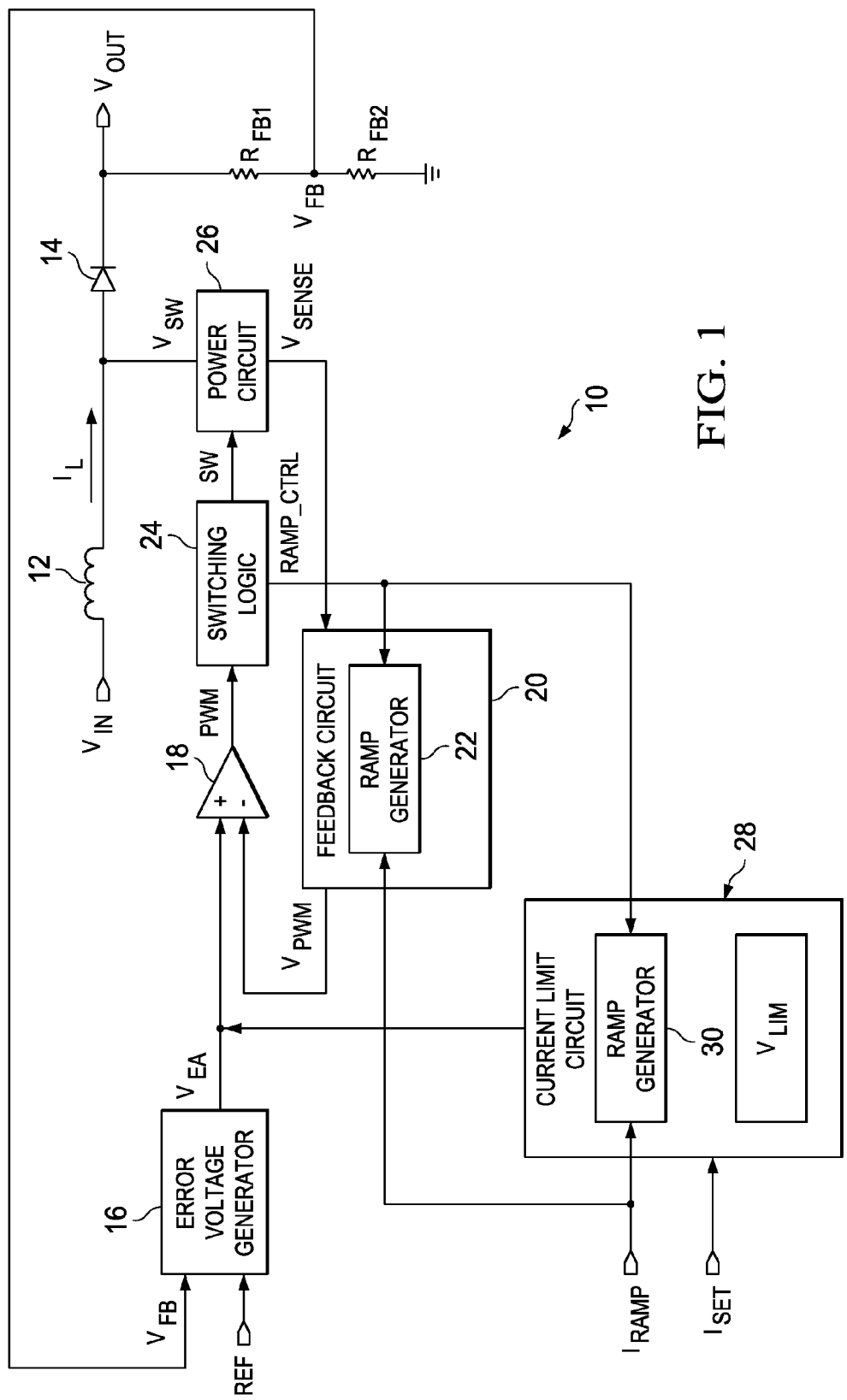
FIG. 1 illustrates an example of a power regulator in accordance with an aspect of the invention.

FIG. 1 illustrates an example of a power regulator 10 in accordance with an aspect of the invention. In the example of FIG. 1, the power regulator 10 is demonstrated as a boost regulator, such that for a given input voltage $V_{IN}$, the power regulator 10 is configured to provide a higher magnitude of an output voltage $V_{OUT}$. The input voltage $V_{IN}$ is provided to a load inductor 12 that conducts a current $I_L$. The current $I_L$ flows through an output diode 14 and sets the output voltage $V_{OUT}$.

The power regulator 10 includes an error voltage generator 16. The error voltage generator 16 receives a reference voltage $V_{REF}$ and a feedback voltage $V_{FB}$ as inputs. In the example of FIG. 1, the feedback voltage $V_{FB}$ is demonstrated as a voltage-divided version of the output voltage $V_{OUT}$ via feedback resistors $R_{FB1}$ and $R_{FB2}$, such that the feedback voltage $V_{FB}$ has a magnitude that is proportional to the output voltage $V_{OUT}$. The reference voltage $V_{REF}$ can be a predetermined voltage corresponding to a desired magnitude of the output voltage $V_{OUT}$. The error voltage generator 16 can include an error amplifier, such that the error voltage generator 16 generates an error voltage $V_{EA}$ that has a magnitude that corresponds to a relative difference between the reference voltage $V_{REF}$ and the feedback voltage $V_{FB}$.

The error voltage $V_{EA}$ is provided to a non-inverting input of a PWM comparator 18. The PWM comparator 18 also receives a PWM voltage $V_{PWM}$ at an inverting input, such that the PWM comparator 18 is configured to compare the error voltage $V_{EA}$ and the PWM voltage $V_{PWM}$, and to provide a switching signal PWM as an output based on the comparison. The PWM voltage $V_{PWM}$ is provided from a feedback circuit 20, such that the PWM voltage $V_{PWM}$ includes a magnitude component that corresponds to a current flow associated with the output of the power regulator 10, as described below. In addition, the feedback circuit 20 includes a ramp generator 22 that is configured to generate a ramp waveform based on a current $I_{RAMP}$. The ramp waveform can be a waveform having a generally sawtooth shape, such that it has repeated periods that each have an increasing magnitude. As a result, the PWM voltage $V_{PWM}$ is a variable signal, such that the switching signal PWM periodically varies between a logic-high state (i.e., on-time) and a logic-low state (i.e., off-time) to define a duty-cycle of operation of the power regulator 10. As is described in greater detail below, the ramp waveform that is generated by the ramp generator 22 can have a period that is based on the duty-cycle of the switching signal PWM.

The switching signal PWM is provided to switching logic 24. The switching logic 24 can include a variety of switches and/or logic gates configured to buffer and/or invert the switching signal PWM. Thus, the switching logic 24 is configured to convert the switching signal PWM into an activation signal SW that is provided to a power circuit 26. The power circuit 26 includes at least one power switch, such as a power transistor. The activation signal SW can thus be configured to control the activation and deactivation of the power switch based on the duty-cycle of the switching signal PWM. As an example, the power switch within the power circuit 26 can be configured, upon activation, to periodically couple a voltage $V_{SW}$ at the anode of the output diode 14 to ground, thus drawing the inductor current $I_L$ from the output of the power regulator 10 to ground. As a result, the output voltage $V_{OUT}$ can be regulated based on the switching of the power switch in the power circuit 26, as defined by the duty-cycle of the switching signal PWM.

The power circuit 26 may also include current sensing circuitry that is configured to sense a current flow through the power switch. As an example, the power circuit 26 may include a current path in parallel with the power switch that is configured to divert a proportional amount of the current through the power switch. The proportional amount of the current can be provided across a sense resistor, such that a sense voltage $V_{SENSE}$ can be output from the power circuit 26. Accordingly, the sense voltage $V_{SENSE}$ can correspond to the current through the power switch during the on-time of the switching signal PWM. The sense voltage $V_{SENSE}$ is provided to the feedback circuit 20, such that it is added to the ramp waveform generated by the ramp generator 22 to form the PWM voltage $V_{PWM}$.

To protect the components of the power regulator 10 from over-current damage, the current flow through the power switch within the power circuit 26 can be limited through additional circuitry. The power regulator 10 may be designed to operate under a wide range of the input voltage $V_{IN}$ to achieve a wide range of the output voltage $V_{OUT}$, and based on a wide range of relative on-times and off-times of the duty-cycle of the switching signal PWM. As a result, it may be desirable to set the current limit through the power switch to a constant value that is independent of the duty-cycle of the switching signal PWM, such that consistent operation of the power regulator 10 can be exhibited under a variety of load conditions.

As described above, the error voltage generator 16 is configured to generate the error voltage $V_{EA}$ as a voltage having a magnitude that is associated with the difference between the feedback voltage $V_{FB}$ and the reference voltage $V_{REF}$. Thus, the current flow through the power switch can be based on a the error voltage $V_{EA}$, such that increasing values of the error voltage $V_{EA}$ can result in increasing magnitudes of the current flow through the power switch. Accordingly, the power regulator 10 includes a current limit circuit 28 that is configured to clamp the error voltage $V_{EA}$ upon the error voltage $V_{EA}$ being substantially equal to a predetermined value. Specifically, the current limit circuit 28 generates a voltage limit $V_{LIM}$ based in part on a bias current $I_{SET}$, such that the error voltage $V_{EA}$ clamps to the approximate value of the voltage limit $V_{LIM}$. The bias current $I_{SET}$ can be predetermined, and can be proportional to the constant current limit of the current flow through the power switch.

The current limit circuit 28 includes a ramp generator 30 that can be configured substantially similar to the ramp generator 22. Specifically, the ramp generator 30 is configured to generate a generally sawtooth ramp waveform based on a current $I_{RAMP}$. The current $I_{RAMP}$ can be a constant current that is based on the input voltage $V_{IN}$ and the output voltage $V_{OUT}$, such that the current $I_{RAMP}$ can be approximately equal to the output voltage $V_{OUT}$ minus the input voltage $V_{IN}$, divided by a resistance that sets the magnitude of the current $I_{RAMP}$. In addition, the period of the ramp waveform generated by the ramp generators 22 and 30 can be based on the duty-cycle of the switching signal PWM. Specifically, in the example of FIG. 1, the switching logic 24 generates a signal RAMP_CTRL to the ramp generators 22 and 30. The signal RAMP_CTRL can be asserted (i.e., logic high) during the on-time and deasserted (i.e., logic low) during the off-time. As an example, the signal RAMP_CTRL can be substantially similar to the switching signal PWM, such as by being a buffered and/or inverted version of it. As another example, the switching signal PWM can be provided directly to the ramp generators 22 and 30. Therefore, the signal RAMP_CTRL can define a first time (e.g., during the on-time) at which the ramp waveform increases in magnitude and a second time (e.g., during the off-time) at which the ramp waveform has a magnitude of approximately zero. Since the on-time and the off-time may vary relative to each other, it is to be understood that a peak value of the ramp waveform generated by the ramp generator 30 may thus vary based on the duty-cycle.

FIG. 2 illustrates an example of a timing diagram 50 in accordance with an aspect of the invention. The timing diagram 50 can correspond to a timing diagram of signals demonstrated in the example of FIG. 1. Therefore, reference is to be made to the example of FIG. 1 in the following discussion of the example of FIG. 2. In addition, it is to be understood that the timing diagram 50 is demonstrated as an ideal timing diagram, such that inherent delays, changes in magnitude, and/or noise characteristics are not demonstrated.

The timing diagram 50 includes the switching signal PWM and the signal RAMP_CTRL, such as described above in the example of FIG. 1, and also includes a ramp voltage $V_{RAMP}$, such as generated by the ramp generator 30. It is to be understood that the ramp voltage $V_{RAMP}$ corresponds to the ramp waveform described in the example of FIG. 1 above, such as generated by the ramp generators 22 and 30. Thus, as demonstrated in the example of FIG. 2, the ramp voltage $V_{RAMP}$ is demonstrated as having a generally sawtooth shape. In the example of FIG. 2, the signal RAMP_CTRL is demonstrated as substantially identical to the switching signal PWM. However, it is to be understood that the signal RAMP_CTRL may have a different magnitude, such as by being buffered, or may be inverted relative to the switching signal PWM to control the ramp voltage $V_{RAMP}$. The timing diagram 50 demonstrates the logic states and relative magnitudes of the signals over four consecutive periods 52, demonstrated in the example of FIG. 2 as PERIOD 1 through PERIOD 4, with each period 52 having a defined duty-cycle.

At a time $T_0$, PERIOD 1 begins. The switching signal PWM is asserted during an on-time, as is the signal RAMP_CTRL. Therefore, the signal RAMP_CTRL defines the beginning of the increase of the ramp voltage $V_{RAMP}$, such that the ramp voltage $V_{RAMP}$ steadily increases from approximately zero magnitude. At a time $T_1$, the on-time concludes, and thus the off-time begins. Thus, the switching signal PWM and signal RAMP_CTRL are deasserted. Accordingly, the ramp voltage $V_{RAMP}$ is set at a substantially zero magnitude throughout the remainder of the off-time. The off-time continues from the time $T_1$ to a time $T_2$, at which PERIOD 2 begins, thus establishing another on-time during which the ramp voltage $V_{RAMP}$ begins to increase again, similar to PERIOD 1.

As described above, the ramp voltage $V_{RAMP}$ is based on the current $I_{RAMP}$, which is a constant current source. Therefore, the ramp voltage $V_{RAMP}$ can have a substantially constant positive slope during each of the on-times defined by the switching signal PWM. As a result, a peak magnitude of the ramp voltage $V_{RAMP}$ can depend on the duty-cycle of the switching signal PWM. In the example of FIG. 2, PERIOD 1 and PERIOD 2 have a duty-cycle of approximately 75%. Thus, the ramp voltage $V_{RAMP}$ is demonstrated as having a peak voltage (i.e., envelope voltage) $V_{ENV1}$ in PERIOD 1 and PERIOD 2. However, at a time $T_3$, PERIOD 3 begins, and at a time $T_5$, PERIOD 4 begins. At a time $T_4$, the on-time of PERIOD 3 ends, thus beginning the off-time of PERIOD 3. Therefore, in the example of FIG. 2, PERIOD 3 and PERIOD 4 are demonstrated as having a duty-cycle of approximately 50%. Accordingly, the ramp voltage $V_{RAMP}$ is demonstrated as having a peak voltage $V_{ENV2}$ during PERIOD 3 and PERIOD 4. As a result, as demonstrated in the example of FIG. 2, because the duty-cycle of the switching signal PWM is shorter in PERIOD 3 and PERIOD 4 than in PERIOD 1 and PERIOD 2, the peak voltage $V_{ENV2}$ is less than the peak voltage $V_{ENV1}$. Thus, it is demonstrated the peak voltage of the ramp voltage $V_{RAMP}$ varies as a function of the duty-cycle of the switching signal PWM.

Referring back to FIG. 1, as described above, the ramp generator 22 and the ramp generator 30 can be configured substantially the same. As a result, the peak voltage of the ramp waveforms generated by the ramp generators 22 and 30 are approximately equal. Therefore, upon the magnitude of the error voltage $V_{EA}$ being clamped to a magnitude approximately equal to the voltage limit $V_{LIM}$, the ramp waveform component of the magnitude of the PWM voltage $V_{PWM}$ and the ramp waveform component of the magnitude of the error voltage $V_{EA}$ effectively cancel. Thus, at the time that the PWM voltage $V_{PWM}$ and the error voltage $V_{EA}$ are substantially equal, and thus the time just prior to the switching signal PWM switching the duty-cycle from the on-time to the off-time, the voltage $V_{SENSE}$ is substantially equal to the constant voltage component of the voltage limit $V_{LIM}$ that is based on the predetermined current $I_{SET}$. Accordingly, the voltage $V_{SENSE}$ cannot exceed the constant voltage component of the voltage limit $V_{LIM}$ upon the error voltage $V_{EA}$ being clamped to the magnitude approximately equal to the voltage limit $V_{LIM}$. As a result, the current through the power switch within the power circuit 26 is limited to the magnitude corresponding to the voltage $V_{SENSE}$ upon the error voltage $V_{EA}$ being clamped to the magnitude approximately equal to the voltage limit $V_{LIM}$.

It is to be understood that the power regulator 10 is not intended to be limited to the example of FIG. 1. For example, although the power regulator 10 is demonstrated as a boost regulator, it is to be understood that limiting the current flow through the power switch, as described above, can be implemented in any of a variety of power regulator types, such as a buck converter and/or a buck/boost converter. In addition, the power regulator 10 is demonstrated simplistically, in that additional components of a boost regulator that are not pertinent to the invention may have been omitted in the description of the example of FIG. 1. Therefore, the power regulator 10 in the example of FIG. 1 can be configured in any of a variety of ways.

FIG. 3 illustrates an example of a power circuit 100 in accordance with an aspect of the invention. The power circuit 100 can correspond to the power circuit 26 in the example of FIG. 1. Therefore, reference is to be made to the example of FIG. 1 in the following description of the example of FIG. 3.

The power circuit 100 includes a first N-type field effect transistor (N-FET) N0 and a second N-FET N1. The N-FET N0 can be the power switch for which the current flow $I_{LIM}$ is to be limited to a substantially constant value. Specifically, the N-FET N0 is interconnected between a node 102 and ground, with the node 102 interconnecting the load inductor 12 and the output diode 14 and having the voltage potential $V_{SW}$. Both of the N-FETs N0 and N1 are biased by the activation signal SW, such that they are activated and deactivated substantially concurrently. In addition, because the activation signal can be based from the switching signal PWM, the N-FETs N0 and N1 can each be activated during the on-time and deactivated during the off-time, as dictated by the duty-cycle of the switching signal PWM.

The N-FET N1 interconnects the node 102 to a sense resistor $R_1$ that is coupled to ground. As a result, the N-FET N1 can be configured as a sense transistor, such that the N-FET N1 and the resistor $R_1$ form a current-path parallel to the N-FET N0, and thus conduct a current proportional to the current $I_{LIM}$. The resistor $R_1$ thus sets the magnitude of the sense voltage $V_{SENSE}$ based on the current flow through the N-FET N1 and the resistor $R_1$. As a result, an equivalent sense resistance $R_{SENSE}$ can be derived from the relative widths $W_{N0}$ and $W_{N1}$ of the N-FETs N0 and N1 (with $W_{N0} \gg W_{N1}$) and the resistance of the resistor $R_1$, as defined in Equation 1:

$$R_{SENSE} \approx R_1 * W_{N0}/W_{N1} \qquad \text{Equation 1}$$

Where:

$R_1$ is the resistance of the resistor $R_1$;

$W_{N0}$ is the width of the N-FET N0; and $W_{N1}$ is the width of the N-FET N1.

The resistance $R_{SENSE}$ thus corresponds to the resistance of the current flow through the N-FET N0. Because of the great disparity in widths of the N-FETs N0 and N1, the resistance $R_{SENSE}$ can have a significantly small value (e.g., 0.1Ω).

It is to be understood that the power circuit 100 is but one example of a power switch and associated sensing circuitry. Therefore, the power circuit 100 is not intended to be limited to the example of FIG. 3. As an example, the power circuit 100 could include a number of additional power switches and/or a number of different manners in which the current $I_L$ can be sensed through the power switch. Accordingly, the power circuit 100 can be configured in any of a variety of ways.

Figure 4:
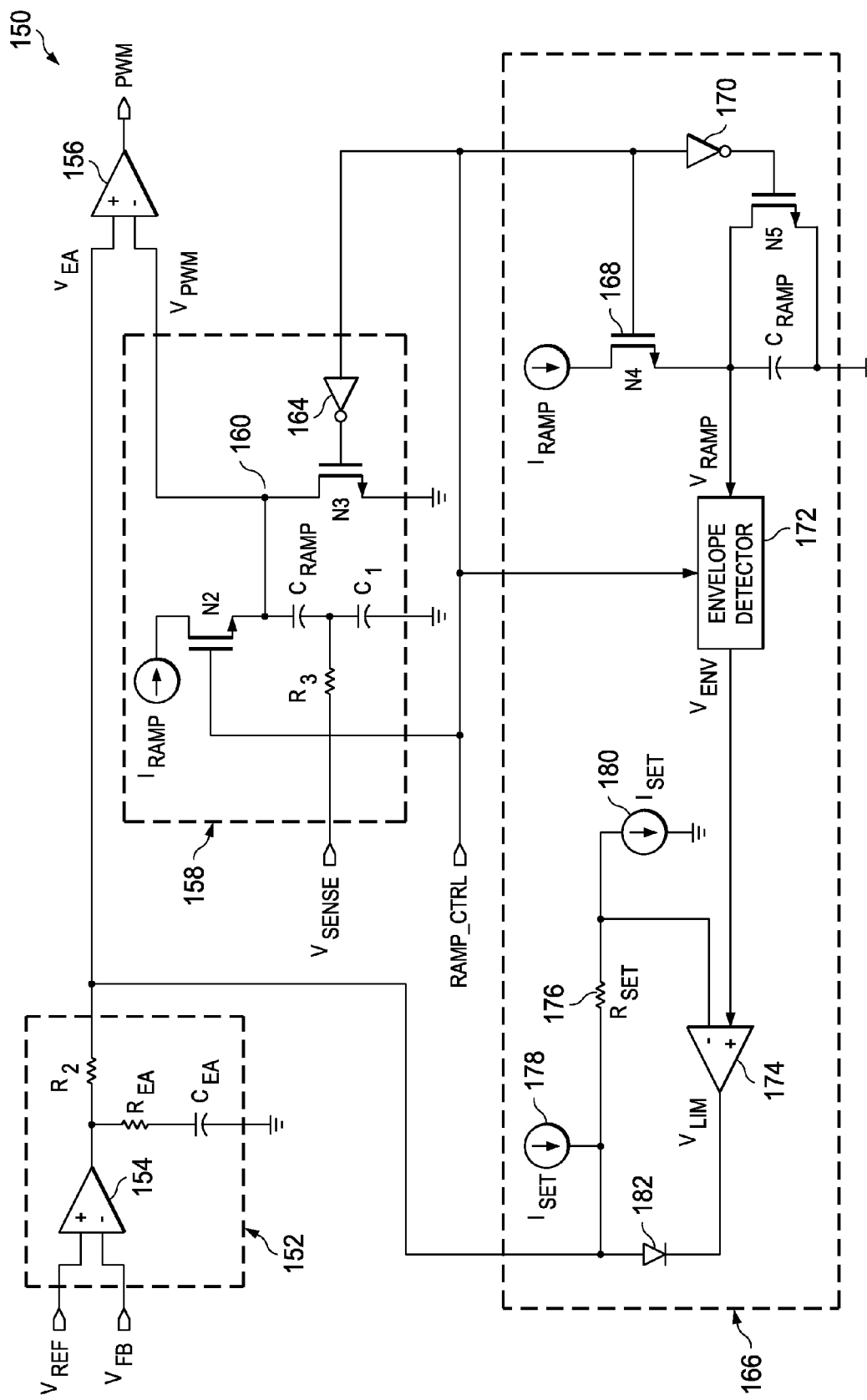
FIG. 4 illustrates an example of a portion of a power regulator in accordance with an aspect of the invention.

FIG. 4 illustrates an example of a system 150 that demonstrates a portion of a power regulator in accordance with an aspect of the invention. The system 150 can correspond to components in the power regulator 10 in the example of FIG. 1. Therefore, reference is to be made to the example of FIG. 1 in the following description of the example of FIG. 4.

The system 150 includes an error voltage generator 152. The error voltage generator 152 can be configured substantially similar to the error voltage generator 16 in the example of FIG. 1. The error voltage generator 152 includes an error amplifier 154 that receives a reference voltage $V_{REF}$ and a feedback voltage $V_{FB}$ as inputs. The feedback voltage $V_{FB}$ can be a voltage-divided version of the output voltage $V_{OUT}$, such that the feedback voltage $V_{FB}$ has a magnitude that is proportional to the output voltage $V_{OUT}$. The reference voltage $V_{REF}$ can be a predetermined voltage corresponding to a desired magnitude of the output voltage $V_{OUT}$. The error amplifier 154 sets an error voltage at its output across a resistor $R_{EA}$ and a capacitor $C_{EA}$, with the error voltage having a magnitude that corresponds to a relative difference between the reference voltage $V_{REF}$ and the feedback voltage $V_{FB}$. The error voltage is provided through a resistor $R_2$ as the error voltage $V_{EA}$ to a non-inverting input of a PWM comparator 156. The PWM comparator 156 is thus configured to compare the error voltage $V_{EA}$ and the PWM voltage $V_{PWM}$, and to provide a switching signal PWM as an output based on the comparison. It is to be understood that the resistor $R_2$ is included to attenuate the magnitude of the error voltage, and that it may not be necessary depending on the magnitudes of reference voltage $V_{REF}$ and the feedback voltage $V_{FB}$.

The system 150 includes a feedback circuit 158 configured to provide a PWM voltage $V_{PWM}$ to an inverting input of the PWM comparator 156. The feedback circuit 158 receives a sense voltage $V_{SENSE}$ corresponding to the current flow through the power switch, such as described above in the example of FIG. 3. The sense voltage $V_{SENSE}$ is provided through a filter that is formed from a resistor $R_3$ and a capacitor $C_1$, such that current spikes resulting, for example, from inrush current through the power switch are effectively filtered from the sense voltage $V_{SENSE}$.

The feedback circuit 158 also includes a current source $I_{RAMP}$, an N-FET N2, and N-FET N3, and a ramp capacitor $C_{RAMP}$ that collectively form a ramp generator 160. The current $I_{RAMP}$ can be a constant current that is approximately equal to the output voltage $V_{OUT}$ minus the input voltage $V_{IN}$, divided by a resistance that sets the magnitude. The N-FET N2 is controlled by the signal RAMP_CTRL, and the N-FET N3 is controlled by an inverted version of the signal RAMP_CTRL, as provided by an inverter 162. Therefore, during the on-time of the duty-cycle of the switching signal PWM, the N-FET N2 is activated, such that the current $I_{RAMP}$ is provided to the ramp capacitor $C_{RAMP}$. Thus, the charge across the ramp capacitor $C_{RAMP}$ begins to build, causing the PWM voltage $V_{PWM}$ to increase. During the off-time of the duty-cycle, the N-FET N2 is deactivated, and the N-FET N3 is activated, thus discharging the ramp capacitor $C_{RAMP}$ to ground.

In addition, the ramp waveform that is generated by the ramp generator 160 is added to the sense voltage $V_{SENSE}$ across the resistor $R_3$. Accordingly, the PWM voltage $V_{PWM}$ is a sum of the sense voltage $V_{SENSE}$ and the voltage across the ramp capacitor $C_{RAMP}$ (i.e., the ramp voltage generated by the ramp generator 160). As a result, during the on-time, the PWM voltage $V_{PWM}$ has an increasing magnitude that is equal to the ramp waveform plus the sense voltage $V_{SENSE}$, and during the off-time has a magnitude that is approximately equal to zero. Furthermore, because the signal RAMP_CTRL signal is asserted during the on-time of the duty-cycle to generate the ramp waveform, the PWM voltage $V_{PWM}$ thus has a period that corresponds to the duty-cycle of the switching signal PWM.

The system 150 includes a current limit circuit 166 that is configured to clamp the error voltage $V_{EA}$ upon the error voltage $V_{EA}$ being substantially equal to a predetermined value. The current limit circuit 166 includes a current source $I_{RAMP}$, an N-FET N4, and N-FET N5, and a ramp capacitor $C_{RAMP}$ that collectively form a ramp generator 168 configured to generate a ramp voltage $V_{RAMP}$. The N-FET N4 is controlled by the signal RAMP_CTRL, and the N-FET N5 is controlled by an inverted version of the signal RAMP_CTRL, as provided by an inverter 170. Therefore, during the on-time of the duty-cycle of the switching signal PWM, the N-FET N4 is activated, such that the current $I_{RAMP}$ is provided to the ramp capacitor $C_{RAMP}$. Thus, the charge across the ramp capacitor $C_{RAMP}$ begins to build, causing the ramp voltage $V_{RAMP}$ to increase. During the off-time of the duty-cycle, the N-FET N4 is deactivated, and the N-FET N5 is activated, thus discharging the ramp capacitor $C_{RAMP}$ to ground.

It is to be understood that the ramp generator 168 can be configured substantially identically to the ramp generator 160, such that the capacitance value of the ramp capacitor $C_{RAMP}$ and the current $I_{RAMP}$ is approximately equal in each of the ramp generators 160 and 168. The ramp voltage $V_{RAMP}$ is provided to an envelope detector 172 that is configured to generate an envelope voltage $V_{ENV}$ that corresponds to the peak magnitude of the ramp voltage $V_{RAMP}$. Accordingly, because the ramp voltage $V_{RAMP}$ has a peak that is based on the duty-cycle of the switching signal PWM, such as described above in the example of FIG. 2, the envelope voltage $V_{ENV}$ likewise has a magnitude that corresponds to the duty-cycle of the switching signal PWM.

Figure 5:
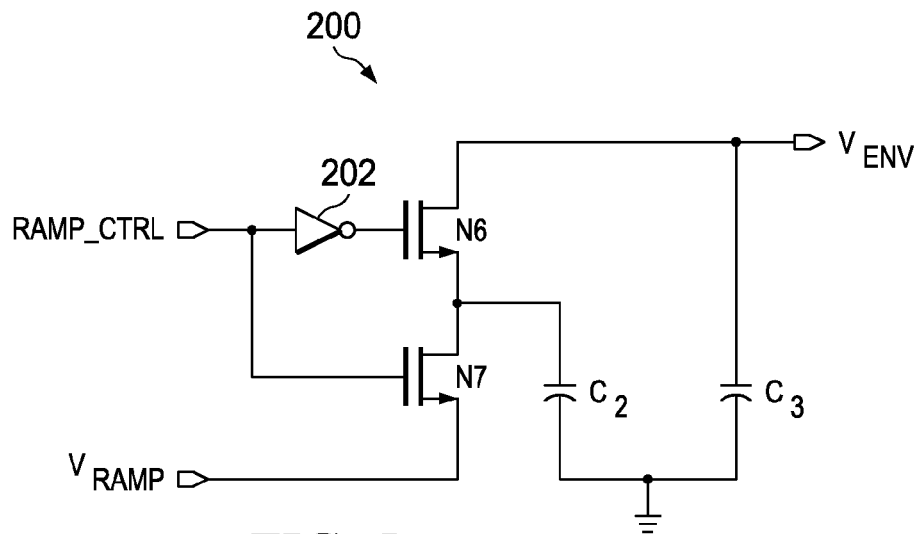
FIG. 5 illustrates an example of an envelope detector in accordance with an aspect of the invention.

FIG. 5 illustrates an example of an envelope detector 200 in accordance with an aspect of the invention. The envelope detector 200 can correspond to the envelope detector 172 in the example of FIG. 4. Therefore, reference is to be made to the example of FIG. 4 in the following description of FIG. 5.

The envelope detector 200 includes an N-FET N6 and an N-FET N7. The N-FET N6 is controlled by an inverted version of the signal RAMP_CTRL via an inverter 202 and interconnects the envelope voltage $V_{ENV}$ and a node 204. The N-FET N7 is controlled by the signal RAMP_CTRL and interconnects the node 204 and the ramp voltage $V_{RAMP}$. The envelope detector 200 includes a capacitor $C_2$ that interconnects the node 204 and ground and a capacitor $C_3$ that interconnects the envelope voltage $V_{ENV}$ and ground.

During the on-time, the N-FET N7 is activated such that the ramp voltage $V_{RAMP}$ is sampled onto the capacitor $C_2$. During the off-time, the N-FET N7 is deactivated and the N-FET N6 becomes activated. Therefore, the sampled voltage across the capacitor $C_2$ is sampled across the capacitor $C_3$, and is thus provided as the envelope voltage $V_{ENV}$. As a result, any variations in the peak voltage of the ramp voltage $V_{RAMP}$ are eventually represented in the charge stored by the capacitor $C_3$. For example, if the peak voltage of the ramp voltage $V_{RAMP}$ increases, the charge across the capacitor $C_2$ increases during the on-time, thus causing the charge across the capacitor $C_3$ to increase during the subsequent off-time. As another example, if the peak voltage of the ramp voltage $V_{RAMP}$ decreases, the charge across the capacitor $C_2$ decreases during the on-time, thus causing the charge across the capacitor $C_3$ to decrease during the subsequent off-time. It is to be understood that, due to the significantly high-frequency of the duty-cycle, it may take multiple cycles for the envelope voltage $V_{ENV}$ to respond to changes in the peak voltage of the ramp voltage $V_{RAMP}$.

It is to be understood that the envelope detector 200 is but one example of an envelope detector. As such, the envelope detector 172 in the example of FIG. 4 is not intended to be limited to the envelope detector 200 in the example of FIG. 5.

Referring back to FIG. 4, the envelope voltage $V_{ENV}$ is provided to a non-inverting input of an operational amplifier (OP-AMP) 174. The OP-AMP 174 is configured to output the voltage limit $V_{LIM}$, and includes a feedback loop 176 that includes a resistor $R_{SET}$ and a current source $I_{SET}$ that flows through the resistor $R_{SET}$ and to ground, demonstrated respectively at 178 and 180. The feedback loop 176 and the OP-AMP 174 are separated at the output of the OP-AMP 174 by a diode 182 having an anode coupled to the error voltage $V_{EA}$ and the feedback loop 176 and a cathode coupled to the output of the OP-AMP 174. The resistor $R_{SET}$ and the current $I_{SET}$ correspond to the current flow through the power switch, as described below, and thus can each be predetermined to set a predetermined set voltage limit that is a constant component of the voltage limit $V_{LIM}$, and thus the substantially constant current limit $I_{LIM}$ through the power switch.

The OP-AMP 174 is thus configured as a summer for envelope voltage $V_{ENV}$ and the predetermined set voltage limit of the feedback loop 176. Specifically, the voltage limit $V_{LIM}$ can be represented by Equation 2 as follows:

$$V_{LIM}=(R_{SET}*I_{SET})+V_{ENV} \quad \text{Equation 2}$$

Where:

$R_{SET}$ is the magnitude of the resistor $R_{SET}$;

$I_{SET}$ is the magnitude of the current $I_{SET}$; and $V_{ENV}$ is the magnitude of the envelope voltage $V_{ENV}$.

Therefore, the voltage limit $V_{LIM}$ includes the constant predetermined set voltage limit that is set by the resistor $R_{SET}$ and the current $I_{SET}$ (i.e., $R_{SET}*I_{SET}$), as well as the variable component of the envelope voltage $V_{ENV}$ that varies as a function of the duty-cycle. Accordingly, upon the error voltage $V_{EA}$ being approximately equal to the voltage limit $V_{LIM}$, the diode 182 begins to bias. As a result, the error voltage $V_{EA}$ is clamped to the approximate value of the voltage limit $V_{LIM}$. It is to be understood that the error voltage $V_{EA}$ may be slightly greater than the voltage limit $V_{LIM}$ (e.g., 0.7 volts), such that the diode 182 achieves the appropriate voltage difference to begin conducting the error voltage $V_{EA}$ to the voltage limit $V_{LIM}$.

As described above, the PWM comparator 156 switches to the off-time upon the PWM voltage $V_{PWM}$ becoming approximately equal to the error voltage $V_{EA}$. Therefore, upon the error voltage $V_{EA}$ being approximately equal to the voltage limit $V_{LIM}$, at a time just prior to the PWM comparator 156 switching to the off-time, the contributions of the magnitude of the ramp voltage $V_{RAMP}$ to both the PWM voltage $V_{PWM}$ and the error voltage $V_{EA}$ are approximately equal. Specifically, at the time of switching to the off-time, the ramp voltage $V_{RAMP}$ that is generated by the ramp generator 160 is approximately equal to the envelope voltage $V_{ENV}$. Therefore, at the time of switching to the off-time, the sense voltage $V_{SENSE}$ is approximately equal to the predetermined set voltage limit ($R_{SET}*I_{SET}$) set by the feedback loop 176. The equations below demonstrate this more clearly:

Upon $V_{EA}$ being clamped:

$$V_{EA}=V_{LIM} \quad \text{Equation 3}$$

At the time of switching:

$$V_{PWM} = V_{EA} \quad \text{Equation 4}$$

Therefore, at the time of switching:

$$V_{PWM} = V_{LIM} \quad \text{Equation 5}$$

$$= V_{SENSE} + V_{RAMP} = (R_{SET} * I_{SET}) + V_{ENV} \quad \text{Equation 6}$$

Since the ramp generators 160 and 168 are configured substantially the same, at the time of switching:

$$V_{RAMP} = V_{ENV} \quad \text{Equation 7}$$

Therefore:

$$V_{SENSE} = (R_{SET} * I_{SET}) \quad \text{Equation 8}$$

Accordingly, as demonstrated by Equations 7 and 8, at the time of switching upon the error voltage $V_{EA}$ being clamped, the magnitude of the ramp waveforms generated by the ramp generators 160 and 168, respectively, cancel relative to each other. As a result, the sense voltage $V_{SENSE}$ is approximately equal to the predetermined set voltage limit ($R_{SET} * I_{SET}$).

As described above with reference to FIG. 3, the equivalent sense resistance $R_{SENSE}$ corresponds to the current $I_{LIM}$ through the power switch N0. Therefore, the current flow through the power switch N0 can be expressed by the following equation:

$$V_{SENSE} = I_{LIM} * R_{SENSE} \quad \text{Equation 9}$$

Accordingly, by substituting Equation 8 into Equation 9, an expression for the current limit through the power switch N0 can be expressed by:

$$I_{LIM} = (R_{SET} * I_{SET}) / R_{SENSE} \quad \text{Equation 10}$$

As demonstrated by Equation 10, the current limit through the power switch N0 is substantially constant, and is therefore substantially fixed and independent of the duty-cycle of the switching signal PWM. Accordingly, the current limit of the power regulator, such as the power regulator 10 in the example of FIG. 1, can be set to allow a wide range of the input voltage $V_{IN}$ and the output voltage $V_{OUT}$.

Figure 6:
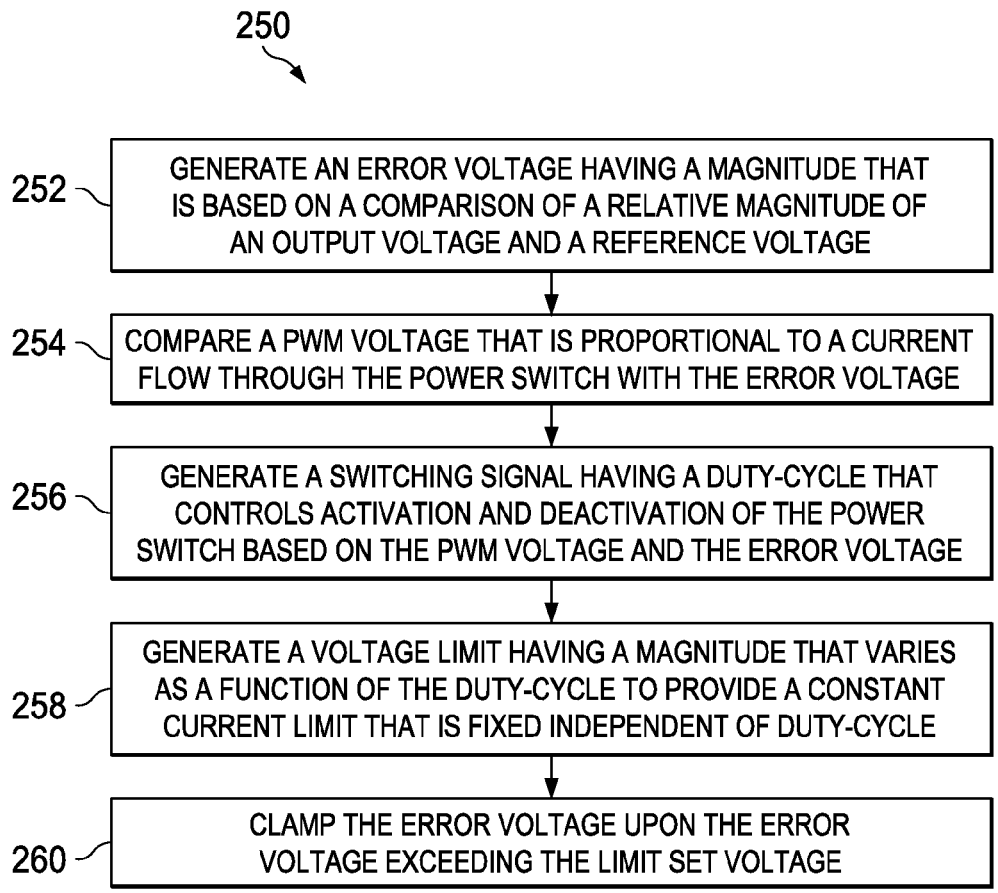
FIG. 6 illustrates an example of a method for providing a constant current limit through a power switch in a power regulator in accordance with an aspect of the invention.

In view of the foregoing structural and functional features described above, certain methods will be better appreciated with reference to FIG. 6. It is to be understood and appreciated that the illustrated actions, in other embodiments, may occur in different orders and/or concurrently with other actions. Moreover, not all illustrated features may be required to implement a method.

FIG. 6 illustrates an example of a method 250 for providing a constant current limit through a power switch in a power regulator in accordance with an aspect of the invention. At 252 an error voltage is generated having a magnitude that is based on a comparison of a relative magnitude of an output voltage of the power regulator system and a reference voltage. The error voltage can be generated from an error amplifier. The magnitude of the output voltage can be determined via a feedback voltage that is a voltage divided version of the output voltage. At 254, a PWM voltage that is proportional to a current flow through a power switch is compared with the error voltage. The PWM voltage includes a ramp waveform that is added to a sensed voltage corresponding to the current flow through the power switch.

At 256, a switching signal having a duty-cycle that controls activation and deactivation of the power switch is generated based on the comparison of the PWM voltage and the error voltage. The switching signal can be generated from a PWM comparator that compares the PWM voltage and the error voltage. At 258, a voltage limit having a magnitude that varies as a function of the duty-cycle is generated to provide a constant current limit of the at least one power switch that is fixed independent of the duty-cycle. The voltage limit can be generated from an OP-AMP, and can include a feedback gain component that is constant, predetermined, and corresponds to the current limit through the power switch. The voltage limit can also include an envelope voltage component that corresponds to a peak voltage associated with the ramp waveform. At 260, the error voltage is clamped upon the error voltage exceeding the voltage limit. The clamping can be based on biasing a diode that interconnects the error voltage and the voltage limit. As a result, upon clamping the error voltage, at the time of the PWM comparator switching to the off-time, the current limit through the power switch is proportional to the constant feedback gain component. Therefore, the current limit through the power switch is constant.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power regulator system comprising:
    an error amplifier that provides an error voltage based on a comparison of a reference voltage and a feedback voltage associated with an output voltage of the power regulator system;
    a pulse-width modulation (PWM) comparator configured to generate a switching signal that controls activation and deactivation of at least one power switch, the PWM comparator defining a duty-cycle of the switching signal based on the error voltage and a PWM voltage; and
    a current limit circuit configured to clamp the error voltage upon the error voltage exceeding a voltage limit having a magnitude that varies as a function of the duty-cycle to provide a predetermined current limit that is substantially fixed independent of the duty-cycle;
    further comprising an envelope detector that receives a ramp waveform having a general sawtooth shape with peak values that vary in conjunction with time varying changes in the output of the PWM comparator and generates an envelope voltage that is associated with the voltage limit based on the peak values of the ramp waveform.

2. The system of claim 1, wherein the current limit circuit comprises a diode having an anode coupled to the error voltage and a cathode held at the voltage limit, the diode being configured to bias and conduct upon the error voltage exceeding the voltage limit.

3. The system of claim 1, wherein the current limit circuit comprises an operational amplifier (OP-AMP) configured to receive the envelope voltage that corresponds to a peak voltage of a ramp waveform, the ramp waveform having a peak value that determines the duty-cycle of the power regulator and a predetermined set voltage limit that corresponds to the predetermined current limit and outputs the voltage limit as the sum of the envelope voltage and the predetermined set voltage limit.

4. The system of claim 3, wherein the current limit circuit further comprises a bias current and a resistor configured in a feedback arrangement with the OP-AMP, the bias current and the resistor each having a predetermined magnitude that defines the predetermined set voltage limit.

5. A power regulator system comprising:
an error amplifier that provides an error voltage based on a comparison of a reference voltage and a feedback voltage associated with an output voltage of the power regulator system;
a pulse-width modulation (PWM) comparator configured to generate a switching signal that controls activation and deactivation of at least one power switch, the PWM comparator defining a duty-cycle of the switching signal based on the error voltage and a PWM voltage; and
a current limit circuit configured to clamp the error voltage upon the error voltage exceeding a voltage limit having a magnitude that varies as a function of the duty-cycle to provide a predetermined current limit that is substantially fixed independent of the duty-cycle;
further comprising a feedback circuit configured to provide a PWM voltage to the PWM comparator, the PWM voltage comprising a sum of a ramp waveform voltage and a sense voltage that is proportional to a current flow through the at least one power switch, the PWM comparator defining the duty-cycle of the switching signal based on a comparison of the PWM voltage with the error voltage.

6. The system of claim 5, wherein the current limit circuit comprises a first ramp generator configured to generate a first ramp waveform having a general sawtooth shape and the feedback circuit comprises a second ramp generator configured to generate a second ramp waveform that is a substantial copy of the first ramp waveform, and wherein the voltage limit comprises a peak voltage of the first ramp waveform and the PWM voltage comprises the second ramp waveform.

7. The system of claim 6, wherein the current limit circuit comprises an envelope detector configured to generate the peak voltage of the first ramp waveform, the envelope detector comprising a first capacitor configured to sample the first ramp waveform during activation of the at least one power switch and a second capacitor configured to sample a voltage across the first capacitor during deactivation of the at least one power switch.

8. The system of claim 1, wherein the voltage limit comprises a sum of a peak voltage of a first ramp waveform and a predetermined set voltage limit that corresponds to the predetermined current limit and wherein the PWM voltage comprises a sense voltage corresponding to the current flow through the at least one power switch plus a second ramp waveform that is a substantial copy of the first ramp waveform, such that the peak voltage the first ramp waveform and the second ramp waveform cancel relative to one another upon the error voltage being clamped and being approximately equal to the PWM voltage to limit the current flow through the at least one power switch to the current limit that is substantially fixed independent of the duty-cycle.

9. The system of claim 8, wherein the current limit circuit comprises an operational amplifier (OP-AMP) configured to output the voltage limit, the predetermined set voltage limit being based on a resistor and a current source having predetermined magnitudes and being configured in a feedback arrangement with the OP-AMP.

10. A method for providing a substantially constant current limit through at least one power switch in a power regulator, the method comprising:
generating an error voltage having a magnitude that is based on a comparison of a relative magnitude of an output voltage of the power regulator system and a reference voltage;
comparing a pulse-width modulation (PWM) voltage that is proportional to a current flow through the at least one power switch with the error voltage;
generating a switching signal having a duty-cycle that controls activation and deactivation of the at least one power switch based on the comparison of the PWM voltage and the error voltage;
generating a voltage limit having a magnitude that varies as a function of the duty-cycle to provide the substantially constant current limit as being fixed independent of the duty-cycle; and
clamping the error voltage upon the error voltage exceeding the voltage limit, wherein generating the voltage limit comprises: providing a feedback current through a feedback resistor of an operational amplifier (OP-AMP), the feedback current and the feedback resistor each having predetermined magnitudes to provide a predetermined set voltage limit that is proportional to the constant current limit; and
providing the voltage limit from an output of the OP-AMP, the voltage limit comprising the predetermined set voltage limit.

11. The method of claim 10, wherein clamping the error voltage comprises biasing a diode having an anode coupled to the error voltage and a cathode coupled to the output of the OP-AMP.

12. The method of claim 10, further comprising:
adding an envelope voltage to the predetermined set voltage limit to generate the limit voltage, the envelope voltage corresponding to a peak voltage of a first ramp waveform having a general sawtooth shape and a period corresponding to the duty-cycle; and adding a second ramp waveform that is a substantial copy of the first ramp waveform to a sense voltage corresponding to the current flow through the at least one power switch.

13. The method of claim 12, wherein providing the envelope voltage comprises:
sampling the first ramp waveform onto a first capacitor during activation of the at least one power switch; and
sampling a voltage across the first capacitor onto a second capacitor during deactivation of the at least one power switch, the envelope voltage being approximately equal to a voltage across the second capacitor.

14. The method of claim 10, further comprising generating the PWM voltage based on adding a voltage that varies as the function of the duty-cycle to a sense voltage corresponding to the current flow through the at least one power switch, wherein generating the voltage limit comprises adding the voltage that varies as the function of the duty-cycle and a predetermined set voltage limit corresponding to the substantially constant current limit through the at least one power switch, and wherein clamping the error voltage comprises limiting the current flow through the at least one power switch to a magnitude that is proportional to the predetermined set voltage limit.

15. A power regulator system comprising:
means for generating an error voltage having a magnitude that is based on a comparison of a relative magnitude of an output voltage of the power regulator system and a reference voltage;
means for generating a first ramp waveform having a general sawtooth shape and a peak voltage that varies as a function of a duty-cycle of the power regulator;
means for generating a second ramp waveform that is a substantial copy of the first ramp waveform;
means for comparing a pulse-width modulation (PWM) voltage with the error voltage to generate a switching signal that controls activation and deactivation of the at least one power switch according to the duty-cycle of the power regulator system, the PWM voltage being a sum of the first ramp waveform and a sense voltage proportional to the current flow through the at least one power switch;

means for providing a voltage limit that is a sum of predetermined set voltage limit corresponding to a predetermined current limit through the at least one power switch and a peak voltage of the second ramp waveform; and means for clamping the error voltage upon the error voltage exceeding the voltage limit to provide the predetermined current limit, such that the current flow through the at least one power switch is limited to the predetermined current limit independent of the duty-cycle of the power regulator system.

16. The system of claim 15, wherein the means for providing the voltage limit comprises means for setting a magnitude of the predetermined set voltage limit based on a predetermined current and a feedback resistor.

17. The system of claim 15, further comprising means for generating an envelope signal based on the second ramp waveform, the envelope signal having a magnitude substantially equal to the peak voltage of the second ramp waveform, the envelope signal being provided to the means for providing the voltage limit.

18. The system of claim 15, wherein each of the means for generating the first ramp waveform and the second ramp waveform comprise means for charging a capacitor during an on-time of the duty-cycle and means for discharging the capacitor during an off-time of the duty cycle, such that upon the means for comparing switching the duty-cycle from the on-time to the off-time while the error voltage is clamped, the first ramp waveform and the second ramp waveform canceling relative to each other in each of the respective PWM voltage and error voltage upon the error voltage being clamped and approximately equal to the PWM voltage.

\* \* \* \* \*